(12) United States Patent
Babin et al.

(10) Patent No.: US 6,988,883 B2
(45) Date of Patent: Jan. 24, 2006

(54) INJECTION MOLDING APPARATUS HAVING A NOZZLE TIP AND A TIP SURROUNDING PIECE OF EQUAL THERMAL CONDUCTIVITY

(75) Inventors: Denis Babin, Georgetown (CA); George Olaru, Bramton (CA)

(73) Assignee: Mold-Masters Limited, Ontario (CA)

( * ) Notice: Subject to any disclaimer, the term of this patent is extended or adjusted under 35 U.S.C. 154(b) by 0 days.

(21) Appl. No.: 10/902,470

(22) Filed: Jul. 30, 2004

(65) Prior Publication Data

US 2005/0003039 A1    Jan. 6, 2005

Related U.S. Application Data

(63) Continuation of application No. 10/817,825, filed on Apr. 6, 2004, now Pat. No. 6,945,768, which is a continuation of application No. 10/262,967, filed on Oct. 3, 2002, now Pat. No. 6,869,276.

(60) Provisional application No. 60/328,830, filed on Oct. 15, 2001, now abandoned.

(30) Foreign Application Priority Data

Oct. 3, 2001    (CA)    .................................... 2358187

(51) Int. Cl.
*B29C 45/20*    (2006.01)

(52) U.S. Cl. .................................. 425/549; 264/328.15
(58) Field of Classification Search ................ 425/549; 264/328.15
See application file for complete search history.

(56) References Cited

U.S. PATENT DOCUMENTS 2,865,050 A    12/1958    Strauss

| 3,488,810 A | 1/1970 | Gellert |
| 3,677,682 A | 7/1972 | Putkowski |
| 3,716,318 A | 2/1973 | Erik et al. |
| 3,741,704 A | 6/1973 | Beasley |
| 3,952,927 A | 4/1976 | Schaumburg et al. |
| 4,004,871 A | 1/1977 | Hardy |
| 4,010,903 A | 3/1977 | Sakuri et al. |
| 4,013,393 A | 3/1977 | Gellert |
| 4,043,740 A | 8/1977 | Gellert |
| 4,053,271 A | 10/1977 | Gellert |

(Continued)

FOREIGN PATENT DOCUMENTS

CA    2082700    5/1994

(Continued)

OTHER PUBLICATIONS

Ewikon, Instruction Manual for Ewikon Hotrunner Systems.

(Continued)

*Primary Examiner*—Tim Heitbrink
(74) *Attorney, Agent, or Firm*—Sterne, Kessler, Goldstein & Fox, P.L.L.C.

(57) ABSTRACT

An injection molding apparatus is provided. The injection molding apparatus includes a manifold having at least one runner that receives melt from a melt source, a heat source for heating the melt, a nozzle in fluid communication with the manifold, and a mold component having a mold cavity for receiving melt from the nozzle. The nozzle includes a nozzle body having a melt passage therethrough, a nozzle tip having a tip melt passage therethrough, wherein the tip melt passage is in fluid communication with the melt passage of the nozzle body, and a tip surrounding piece that is removably coupled to the nozzle body. The tip surrounding piece retains the nozzle tip in position with respect to the nozzle body. The tip surrounding piece is preferably formed of a material that has a thermal conductivity that is equivalent to that of the nozzle tip.

36 Claims, 14 Drawing Sheets

U.S. PATENT DOCUMENTS

| | | |
|---|---|---|
| 4,173,448 A | 11/1979 | Rees et al. |
| 4,268,240 A | 5/1981 | Rees et al. |
| 4,268,241 A | 5/1981 | Rees et al. |
| 4,279,588 A | 7/1981 | Gellert |
| 4,286,941 A | 9/1981 | Gellert |
| 4,306,852 A | 12/1981 | Mateev et al. |
| 4,312,630 A | 1/1982 | Travaglini |
| 4,368,028 A | 1/1983 | Grish et al. |
| 4,412,807 A | 11/1983 | York |
| 4,517,453 A | 5/1985 | Tsutsumi |
| 4,652,230 A | 3/1987 | Osuna-Diaz |
| 4,662,837 A | 5/1987 | Anderson |
| 4,768,283 A | 9/1988 | Gellert |
| 4,768,945 A | 9/1988 | Schmidt et al. |
| 4,771,164 A | 9/1988 | Gellert |
| 4,781,572 A | 11/1988 | Boring |
| 4,787,836 A | 11/1988 | Osuna-Diaz et al. |
| 4,832,593 A | 5/1989 | Brown |
| 4,875,848 A | 10/1989 | Gellert |
| 4,902,218 A | 2/1990 | Leonard et al. |
| 4,911,636 A | 3/1990 | Gellert |
| 4,945,630 A | 8/1990 | Gellert |
| 4,950,154 A | 8/1990 | Moberg |
| 4,954,072 A | 9/1990 | Zimmerman |
| 4,981,431 A | 1/1991 | Schmidt |
| 5,015,170 A | 5/1991 | Gellert |
| 5,028,227 A | 7/1991 | Gellert et al. |
| 5,030,084 A | 7/1991 | Gellert et al. |
| 5,053,271 A | 10/1991 | Mori et al. |
| 5,067,893 A | 11/1991 | Osuna-Diaz |
| 5,139,724 A | 8/1992 | Hofstetter et al. |
| 5,141,696 A | 8/1992 | Osuna-Diaz |
| 5,208,052 A | 5/1993 | Schmidt et al. |
| 5,254,305 A | 10/1993 | Fernandez et al. |
| 5,268,184 A | 12/1993 | Gellert |
| 5,269,677 A | 12/1993 | Gauler |
| 5,299,928 A | 4/1994 | Gellert |
| 5,324,191 A | 6/1994 | Schmidt |
| 5,334,008 A | 8/1994 | Gellert |
| 5,360,333 A | 11/1994 | Schmidt |
| 5,374,182 A | 12/1994 | Gessner |
| 5,421,716 A | 6/1995 | Gellert |
| 5,443,381 A | 8/1995 | Gellert |
| 5,474,439 A | 12/1995 | McGrevy |
| 5,492,467 A | 2/1996 | Hume et al. |
| 5,501,594 A | 3/1996 | Glozer et al. |
| 5,505,613 A | 4/1996 | Krummenacher |
| 5,545,028 A | 8/1996 | Hume et al. |
| 5,554,395 A | 9/1996 | Hume et al. |
| 5,569,475 A | 10/1996 | Adas et al. |
| 5,652,003 A | 7/1997 | Gellert |
| 5,658,604 A | 8/1997 | Gellert et al. |
| 5,674,439 A | 10/1997 | Hume et al. |
| 5,686,122 A | 11/1997 | Huntington et al. |
| 5,695,793 A | 12/1997 | Bauer |
| 5,700,499 A | 12/1997 | Bauer |
| 5,707,667 A | 1/1998 | Galt et al. |
| 5,736,171 A | 4/1998 | McGrevy |
| 5,795,599 A | 8/1998 | Gellert |
| 5,804,228 A | 9/1998 | Kofsman et al. |
| 5,811,140 A | 9/1998 | Manner |
| 5,820,899 A | 10/1998 | Gellert et al. |
| 5,834,041 A | 11/1998 | Sekine et al. |
| 5,849,343 A | 12/1998 | Gellert et al. |
| 5,871,785 A | 2/1999 | Van Boekel |
| 5,871,786 A | 2/1999 | Hume et al. |
| 5,879,727 A | 3/1999 | Puri |
| 5,885,628 A | 3/1999 | Swenson et al. |
| 5,894,025 A | 4/1999 | Lee et al. |
| 5,895,669 A | 4/1999 | Seres, Jr. et al. |
| 5,925,386 A | 7/1999 | Moberg |
| 5,941,637 A | 8/1999 | Maurer |
| 5,948,450 A | 9/1999 | Swenson et al. |
| 5,980,234 A | 11/1999 | Harley |
| 5,980,237 A | 11/1999 | Swenson et al. |
| 6,003,182 A | 12/1999 | Song |
| 6,009,616 A | 1/2000 | Gellert |
| 6,017,209 A | 1/2000 | Gellert et al. |
| 6,022,210 A | 2/2000 | Gunther |
| 6,030,202 A | 2/2000 | Gellert et al. |
| 6,050,806 A | 4/2000 | Ko |
| 6,074,195 A | 6/2000 | Belous |
| 6,089,468 A | 7/2000 | Bouti |
| 6,135,757 A | 10/2000 | Jenko |
| 6,143,358 A | 11/2000 | Singh et al. |
| 6,164,954 A | 12/2000 | Mortazavi et al. |
| 6,220,851 B1 | 4/2001 | Jenko |
| 6,227,461 B1 | 5/2001 | Schroeder et al. |
| 6,234,783 B1 | 5/2001 | Shibata et al. |
| 6,245,278 B1 | 6/2001 | Lausenhammer et al. |
| 6,254,377 B1 | 7/2001 | Kazmer et al. |
| 6,261,084 B1 | 7/2001 | Schmidt |
| 6,264,460 B1 | 7/2001 | Wright et al. |
| 6,273,706 B1 | 8/2001 | Gunther |
| 6,287,107 B1 | 9/2001 | Kazmer et al. |
| 6,309,208 B1 | 10/2001 | Kazmer et al. |
| 6,315,549 B1 | 11/2001 | Jenko et al. |
| 6,318,990 B1 | 11/2001 | Gellert et al. |
| 6,331,106 B1 | 12/2001 | Helldin |
| 6,358,038 B1 | 3/2002 | Rozenberg |
| 6,358,039 B1 | 3/2002 | Manner et al. |
| 6,394,785 B1 | 5/2002 | Ciccone |
| 6,419,116 B1 | 7/2002 | Eigler et al. |
| 6,428,305 B2 | 8/2002 | Jenko |
| 6,533,571 B2 | 3/2003 | Fikani |
| 6,609,902 B1 | 8/2003 | Blais et al. |
| 6,709,262 B2 | 3/2004 | Fong |
| 6,726,467 B1 | 4/2004 | Lefebure |
| 6,769,901 B2 | 8/2004 | Babin et al. |
| 6,821,112 B2 | 11/2004 | Eigler et al. |
| 6,832,909 B2 | 12/2004 | Bazzo et al. |
| 6,869,276 B2 * | 3/2005 | Babin et al. ................. 425/549 |
| 2003/0008034 A1 | 1/2003 | Niewels |
| 2003/0082263 A1 | 5/2003 | Olaru |
| 2003/0082264 A1 | 5/2003 | Babin et al. |
| 2003/0086997 A1 | 5/2003 | Olaru |
| 2003/0170340 A1 | 9/2003 | Sicilia et al. |
| 2003/0235638 A1 | 12/2003 | Gellert |
| 2004/0071817 A1 | 4/2004 | Fischer et al. |
| 2004/0076708 A1 | 4/2004 | Lefebure |

FOREIGN PATENT DOCUMENTS

| | | |
|---|---|---|
| CA | 2190569 | 5/1998 |
| DE | 3245571 A1 | 6/1984 |
| DE | 29602484 | 5/1996 |
| DE | 19608676 | 1/1997 |
| DE | 10008722 A1 | 8/2001 |
| DE | 10037739 A1 | 2/2002 |
| EP | 0590677 A1 | 4/1994 |
| EP | 0638407 | 2/1995 |
| EP | 0743158 A1 | 11/1996 |
| EP | 0750975 A1 | 1/1997 |
| EP | 0835176 B1 | 4/1998 |
| EP | 0873841 | 10/1998 |
| EP | 0920969 A1 | 6/1999 |
| EP | 0743158 B1 | 8/1999 |
| EP | 0962296 A2 | 12/1999 |
| EP | 1188537 A2 | 3/2002 |
| EP | 1321274 A1 | 6/2003 |
| FR | 2537497 | 6/1984 |
| GB | 1 540 698 | 2/1979 |
| JP | 05-177664 | 7/1993 |
| JP | 05-261770 | 10/1993 |

| | | |
|---|---|---|
| JP | 05-309695 | 11/1993 |
| JP | 06-143358 | 5/1994 |
| JP | 07-148786 | 6/1995 |
| JP | 08-90598 | 4/1996 |
| JP | 10-034708 | 2/1998 |
| JP | 10-264222 | 10/1998 |
| JP | 11-254488 | 9/1999 |
| JP | 2002-307492 | 10/2002 |
| JP | 2003-11173 | 1/2003 |
| JP | 2003-11174 | 1/2003 |
| JP | 2003-11176 | 1/2003 |
| WO | WO 84/00922 | 3/1984 |
| WO | WO 97/02129 | 1/1997 |
| WO | WO 00/48814 | 8/2000 |
| WO | WO 01/28750 A1 | 4/2001 |
| WO | WO 01/78961 | 10/2001 |
| WO | WO 02/40245 A1 | 5/2002 |
| WO | WO 03/004243 | 1/2003 |
| WO | WO 03/028973 | 4/2003 |
| WO | WO 03/028974 | 4/2003 |
| WO | WO 03/070446 | 8/2003 |
| WO | WO 03/086734 | 10/2003 |
| WO | WO 2004/12923 | 2/2004 |

OTHER PUBLICATIONS

Husky Injection Molding Systems, S.A., 750 Series, Oct. 1988.

J.D. Robinson, "Gating and Cooling Techniques for Polypropylene," Plastics, Aug., 1965, pp. 47-51.

H.P. Manner, "Nadelverschluβdusen fur kurze Zykluszeit," Kunststoffe 85(2): 166-168(1995).

Ewikon, Hotrunner Systems for Large Parts, pp. 2-11, May 2000.

Ewikon, Product Guide, "Internally Heated Hotrunner Systems," pp. 2-7, Oct. 2000.

Ewikon Product Catalog entitled "AuBenbeheizte HeiBkanalduse, 230 V, fur schnelle Farbwechsel," 3 pgs., dated Oct. 2000.

Daniel Frenkler and Henry K. Zawistowski—RAPRA Technology Ltd., "Hot Runners in Injection Moulds," 2001.

Ewikon, Hotrunner Systems for the Packaging and Medical Industry, pp. 2-7, Jun. 2001.

Ewikon, HPS III-NV Valve Gate Systems, "All Advantages of the Valve Gate Technology in a Most Compact System," p. 209, Oct. 2001.

Ewikon, HPS IIII-VT Nozzles, 230 V Externally Heated, "For Multi-Cavity Applications and Close Cavity Spacing," pp. 2-7, Oct. 2001.

Redacted letter and attached figure addressed to Mold Masters Limited from the representative of Mr. Maurizio Bazzo dated Dec. 21, 2001.

Ewikon, HPS III Single Tips, 230 V Externally Heated, "HPS III-SE High Performance Single Tips, 230 V With Tip Sealing Technology," pp. 2-9, Mar. 2002.

Images and information from "Gunther Hot Runner Technology," taken from Gunther website Aug. 2003.

PCT Search Report for PCT/CA03/01154 dated Dec. 03, 2004.

* cited by examiner

INJECTION MOLDING APPARATUS HAVING A NOZZLE TIP AND A TIP SURROUNDING PIECE OF EQUAL THERMAL CONDUCTIVITY

CROSS-REFERENCE TO RELATED APPLICATIONS

This application is a continuation of U.S. application Ser. No. 10/817,825 filed Apr. 6, 2004, which is a continuation of U.S. application Ser. No. 10/262,967 filed Oct. 3, 2002 now U.S. Pat. No. 6,869,276, which claims benefit of U.S. Provisional Application No. 60/328,830, filed Oct. 15, 2001, the entire disclosures of which are hereby incorporated by reference.

BACKGROUND OF THE INVENTION

1. Field of the Invention

This invention relates to an injection molding apparatus, and more particularly to a nozzle in an injection molding apparatus.

2. Background Art

A hot runner injection molding apparatus typically includes nozzles that are heated to maintain melt therein at a controlled temperature. The nozzles are typically in contact with a mold component that defines one or more mold cavities. The mold cavities in the mold component are filled with melt that first passes through the nozzles. The mold component is then typically cooled in order to solidify the melt in the mold cavities, thus forming a plurality of molded parts, which are then ejected from the mold cavities.

Because the nozzles are typically heated, and the mold component is cooled for at least a portion of an injection molding cycle, it is desirable to have a relatively low heat transfer from the nozzles into the mold component. Many nozzle constructions have been proposed in the past to address this issue.

An example of such a nozzle construction is shown in U.S. Pat. No. 5,554,395, to Hume et at. The '395 patent teaches a multi-piece nozzle tip assembly including a tip piece, a tip surrounding piece and a resilient element. The resilient element is provided between the tip piece and the mold component, to inhibit melt leakage therepast. However, heat can be lost from the tip piece through the resilient element and into the mold component. In particular, the heat losses occur near the downstream end of the tip piece, where control over the temperature of the melt is particularly important.

Thus, there is a continuing need for new nozzle constructions that have further improved heat transfer efficiency.

BRIEF SUMMARY OF THE INVENTION

In accordance with one aspect of the present invention, there is provided an injection molding apparatus including a manifold, a nozzle, a heat source thermally coupled to the nozzle, and a mold component having a mold cavity for receiving melt from the nozzle through a mold gate. The manifold includes at least one runner that receives melt from a melt source. The nozzle is adapted to be in fluid communication with at least one runner in the manifold. The nozzle includes, a nozzle body having a melt passage therethrough, a nozzle tip having a tip melt passage therethrough, wherein the tip melt passage is in fluid communication with the melt passage of the nozzle body, and a tip surrounding piece that is removably coupled to the nozzle body. At least a portion of the inner surface of the tip surrounding piece is at a distance from the outer surface of the nozzle tip to thereby define a chamber. In one embodiment, the tip surrounding piece is formed of a material that has a thermal conductivity that is substantially equal to that of the nozzle tip.

In one embodiment, the nozzle tip includes a retaining surface and the tip surrounding piece includes a support surface. The nozzle tip is aligned such that the support surface of the tip surrounding piece abuts the retaining surface of the nozzle tip to thereby retain the nozzle tip in position with respect to the nozzle body. In one embodiment, the retaining surface of the nozzle tip may take the form of a shoulder, while the support surface of the tip surrounding piece may take the form of a jam surface. The tip surrounding piece may be threadably engaged with the nozzle body. The tip melt passage may take a generally linear path, or may alternatively include an exit that is off-center from the longitudinal axis of the tip melt passage. The nozzle tip and tip surrounding piece are formed of H13.

In an embodiment, the injection molding apparatus may also include a heater thermally coupled to the nozzle. The injection molding apparatus may further include a mold plate, wherein the tip surrounding piece touches the mold plate to thereby form a seal.

In an embodiment, the nozzle tip is formed of a metallic material and the tip surrounding piece is preferably formed of the same metallic material.

In an embodiment, the nozzle tip is formed of a first material and the tip surrounding piece is formed of a second material; wherein the thermal conductivity of the first material is equivalent to the thermal conductivity of the second material.

BRIEF DESCRIPTION OF THE DRAWINGS/FIGURES

For a better understanding of the present invention, and to show more clearly how it may be carried into effect, reference will now be made by way of example to the accompanying drawings.

DETAILED DESCRIPTION OF THE INVENTION

Figure 1:
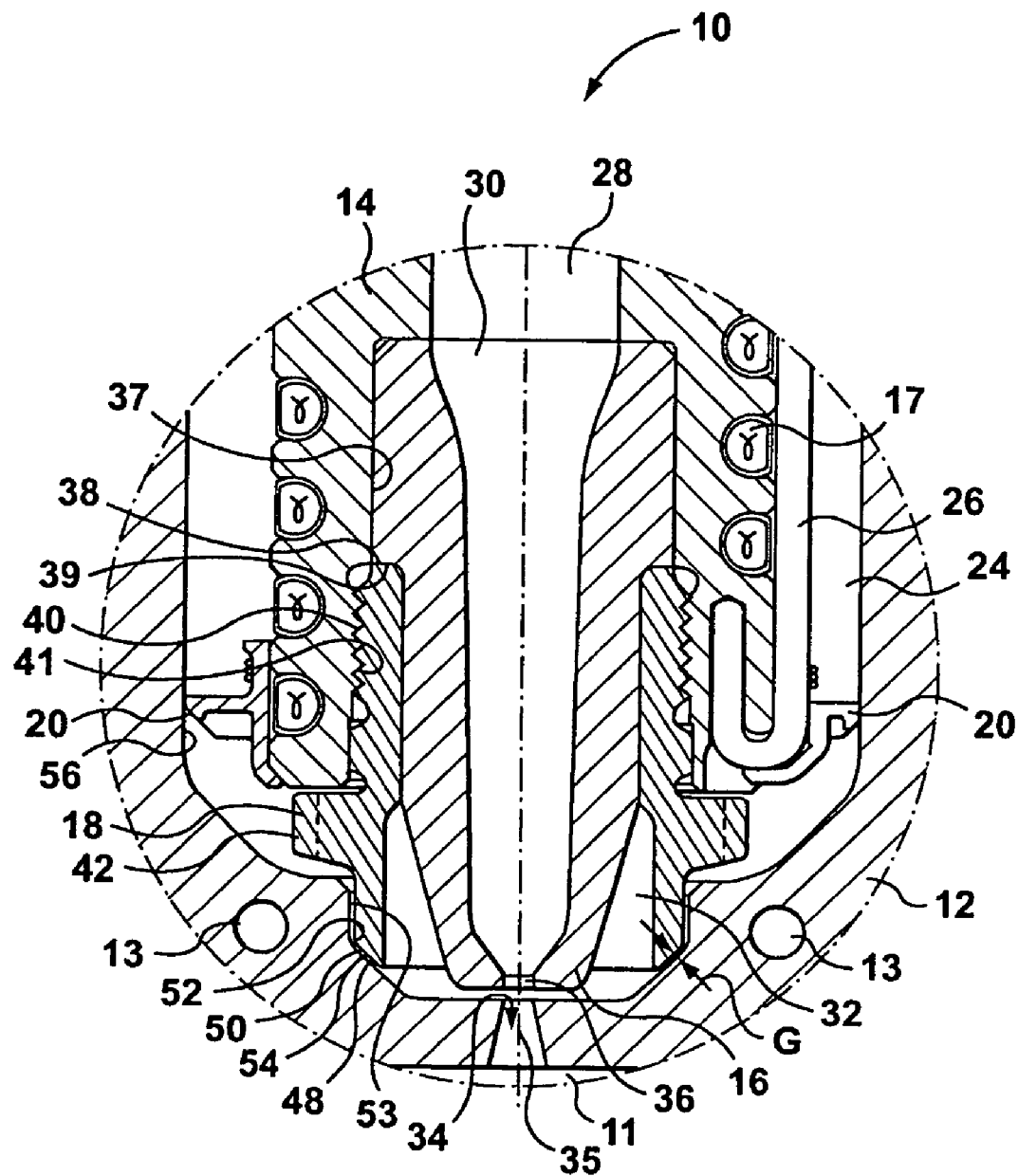
FIG. 1 is a sectional view of a portion of a nozzle in accordance with a first embodiment of the present invention.

Reference is made to FIG. 1, which shows a nozzle 10, in accordance with a first embodiment of the present invention. Nozzle 10 is for transferring melt from a runner in a manifold in a hot runner injection molding apparatus to a mold cavity 11 in a mold component 12. Mold cavity cooling channels 13 may optionally be included in mold component 12.

Nozzle 10 includes a nozzle body 14, a tip 16, and a heater 17 and may include a tip surrounding piece 18, an alignment piece 20 and a thermocouple 26. The nozzle body 14 has a body melt passage 28 that passes therethrough.

The heater 17 may be any suitable kind of heater, such as a resistive wire heater, or a sleeve heater, as long as it is thermally connected to the nozzle body 14, i.e. the heater 17 is connected such that heat is transferable from the heater 17 to the nozzle body 14. For example, the heater 17 may wrap around the nozzle body 14 in a groove on the outer surface of the nozzle body 14.

The tip 16 may be removably connected to the nozzle body 14. The tip 16 defines a tip melt passage 30 therethrough that is downstream from, and in fluid communication with, the body melt passage 28. The tip melt passage 30 may exit from tip 16 into a chamber 32. A gate 34 transfers melt from the chamber 32 into the mold cavity 11.

Melt passes from a melt source, through one or more runners in a runner component such as a manifold, through the nozzle body melt passage 28, through the tip melt passage 30, through the chamber 32, through the gate 34 and finally into the mold cavity 11. The center of the gate 34 defines an axis 35, which is parallel to the direction of flow of melt through gate 34, into the mold cavity 11.

The exit from the tip melt passage into the chamber 32 is shown at 36. Exit 36 may be concentric with respect to axis 35, as shown in FIG. 1.

Because the melt flows through the tip 16, the tip 16 can be used to transfer heat from the heater 17 to the melt. To facilitate the heat transfer, the tip 16 is preferably made from a thermally conductive material, such as Beryllium-Copper.

Because of the melt flow through tip 16, the tip 16 may be exposed to a highly abrasive environment, and it may be desirable to make the tip 16 from a wear resistant material. An example of a material that is both thermally conductive and wear resistant is Tungsten Carbide. The tip 16 may be made in accordance with the teachings in U.S. Pat. No. 5,658,604 (Gellert et al.), which is hereby incorporated by reference and which discloses the construction of a nozzle tip using Tungsten Carbide.

The tip 16 may be positioned within a bore 37 in the nozzle body 14. Depending on the material selected for the tip 16, a threaded portion can be relatively difficult to machine. Furthermore, such a threaded portion can be brittle and subject to premature failure, depending on the material of manufacture for the tip 16. Thus, by making the tip 16 threadless, a greater number of materials are available for its manufacture.

Furthermore, by making the tip 16 threadless, some cost of manufacture is saved for the tip 16 and correspondingly for the nozzle body 14, relative to a threaded tip.

The tip surrounding piece 18 may retain the tip 16 in place in the nozzle body 14. The tip surrounding piece 18 may include a jam surface 38 which abuts a shoulder 39 on the tip 16 to retain the tip 16 in place. The jam surface 38 and the shoulder 39 may cooperate to form a mechanical seal.

The tip surrounding piece 18 may be removably attachable to the nozzle body 14. For example, the tip surrounding piece 18 may include a tip surrounding piece threaded portion 40 for mating with a corresponding nozzle body threaded portion 41 on the nozzle body 14. The threaded portion 40, as shown in FIG. 1, is an external thread; however, it is alternatively possible for the tip surrounding piece to include an internal thread to mate with an external thread on the nozzle body 14.

The tip surrounding piece 18 may also include a tool engagement portion 42, for receiving a tool (not shown), for the installation and removal of the tip surrounding piece 18 with respect to the nozzle body.

Figure 2:
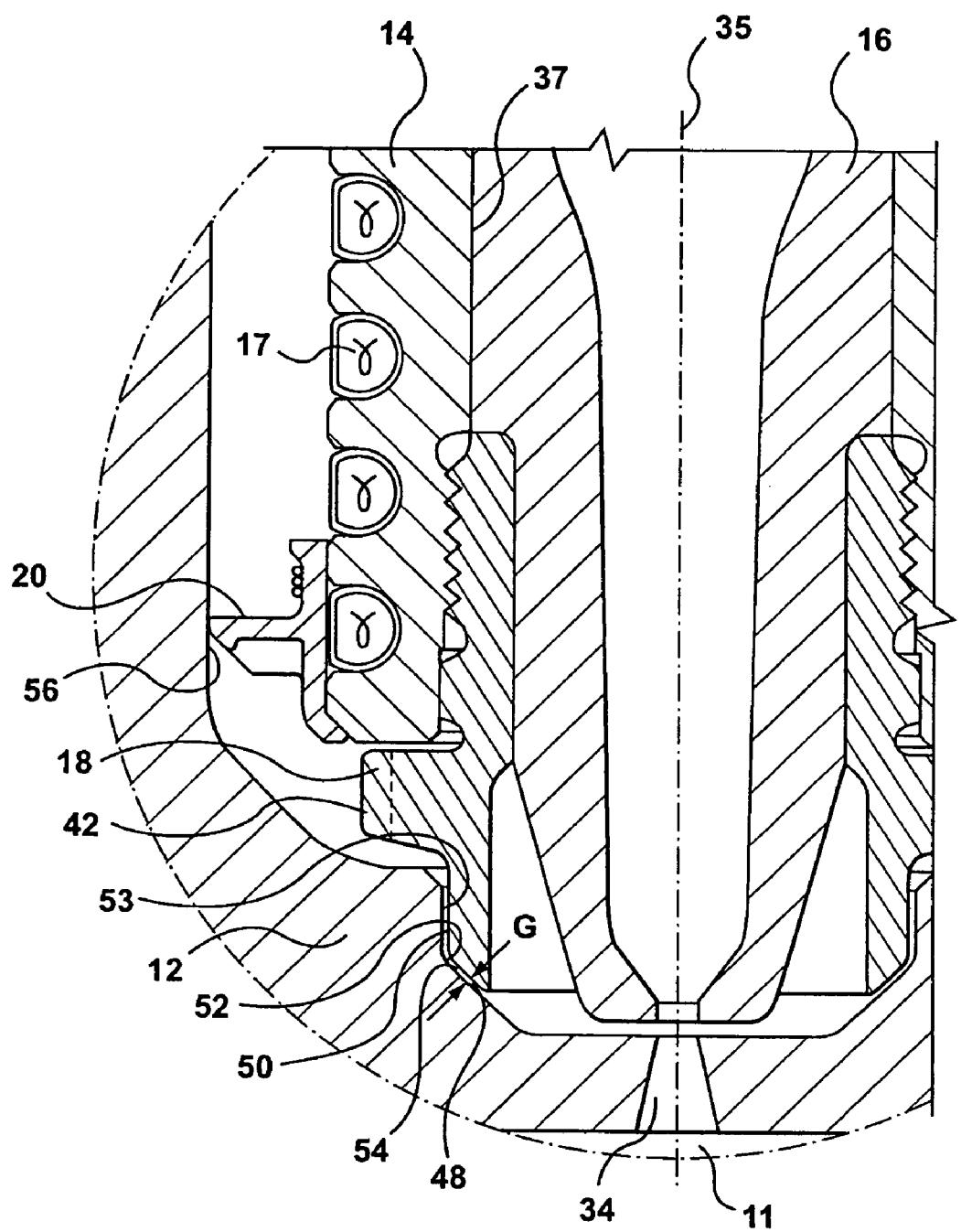
FIG. 2 is a magnified view of a sealing portion of the nozzle shown in FIG. 1.

A gap seal 48 may be formed by the tip surrounding piece 18 in cooperation with the mold component 12, as shown more clearly in FIG. 2. More specifically, a tip surrounding piece sealing surface 50 on the tip surrounding piece 18 may cooperate with a mold component sealing surface 52 on the mold component 12 to form the gap seal 48. The tip surrounding piece sealing surface 50 may be an outer surface on the tip surrounding piece 18, and the mold component sealing surface 52 may be the wall of the nozzle well, which is shown at 53. The tip surrounding piece sealing surface 50 and the mold component sealing surface 52 are separated from each other by a gap G. The tip surrounding piece sealing surface 50 may be referred to as the first gap seal surface 50, and the mold component sealing surface 52 may be referred to as the second gap seal surface 52.

Due to the viscosity of the melt in the chamber 32, the proximity of the first tip surrounding piece sealing surface 50 and the mold component sealing surface 52 inhibits melt from flowing between the first tip surrounding piece sealing surface 50 and the tip sealing surface 52. Thus, the gap G, in conjunction with the viscosity of the melt, acts as a seal.

The Gap G may be less than approximately 0.07 mm if it is the only intended seal and is therefore not combined with a mechanical seal. If the gap seal 48 is used in combination with a mechanical seal, the gap G may optimally be between approximately 0.15 mm and approximately 0.25 mm. It will be noted that the gap G required to inhibit the flow of melt is dependent on the specific molding application. The rheological properties of the melt at the injection temperature, such as its viscosity, determine the maximum gap G that provides the desired seal.

An advantage to including the gap seal 48 is that the manufacturing tolerances for sealing surfaces 50 and 52 are less demanding, relative to a typical mechanical sealing portion. A further advantage is that because melt does not pass through the gap seal 48, an air space 54 is maintained between the tip surrounding piece 18 and the mold component 12. The air space 54 provides an insulative layer to reduce heat transfer between the tip surrounding piece 18, and from the entire nozzle 10 in general, into the mold component 12.

To further reduce heat losses from the tip surrounding piece 18, and the nozzle 10, into the mold component 12, the tip surrounding piece 18 may be made from a material that has a thermal conductivity that is lower than that of the material for the tip 16, depending on the specific requirements of the molding application.

The tip surrounding piece 18 may alternatively be made from a material that has a thermal conductivity that is similar to that of the nozzle tip 16. Because the tip surrounding piece 18 may be positioned between a portion of the heater 17 and the tip melt passage 30, as shown in FIG. 1, it may be advantageous to make the tip surrounding piece 18 from a material that has a thermal conductivity that is generally equal to that of the tip 16, to improve heat transfer between the heater 17 and the tip melt passage 30.

Because the melt that contacts the tip surrounding piece 18 is generally slower moving than the melt flowing through the tip 16, the tip surrounding piece 18 may be made from a material that is less wear resistant than that of the tip 16. Accordingly, the tip surrounding piece 18 may be made from a material that is relatively easily machined with threads.

Referring to FIG. 1, the alignment piece 20 may be included to align the nozzle 10 with respect to the gate 34 in molding applications where such alignment is important. The alignment piece 20 may be positioned between the nozzle body 14 and a bore 56 in the mold component 12. The bore 56 includes therein, the nozzle well 53. The alignment piece 20 may be positioned between the mold component 12 and any other suitable component of the nozzle 10, instead of the nozzle body 10.

The alignment piece 20 may be made from a material that has a lower thermal conductivity than that of the nozzle portion with which it is in contact, which is in this case, the nozzle body 14. For example, the alignment piece 20 may be made from tool steel, titanium, H13, or any other suitable material. It is alternatively possible for the alignment piece 20 to be integrally formed into the nozzle body 14, or into any other suitable portion of the nozzle 10, such as the tip surrounding piece 18.

Figure 3A:
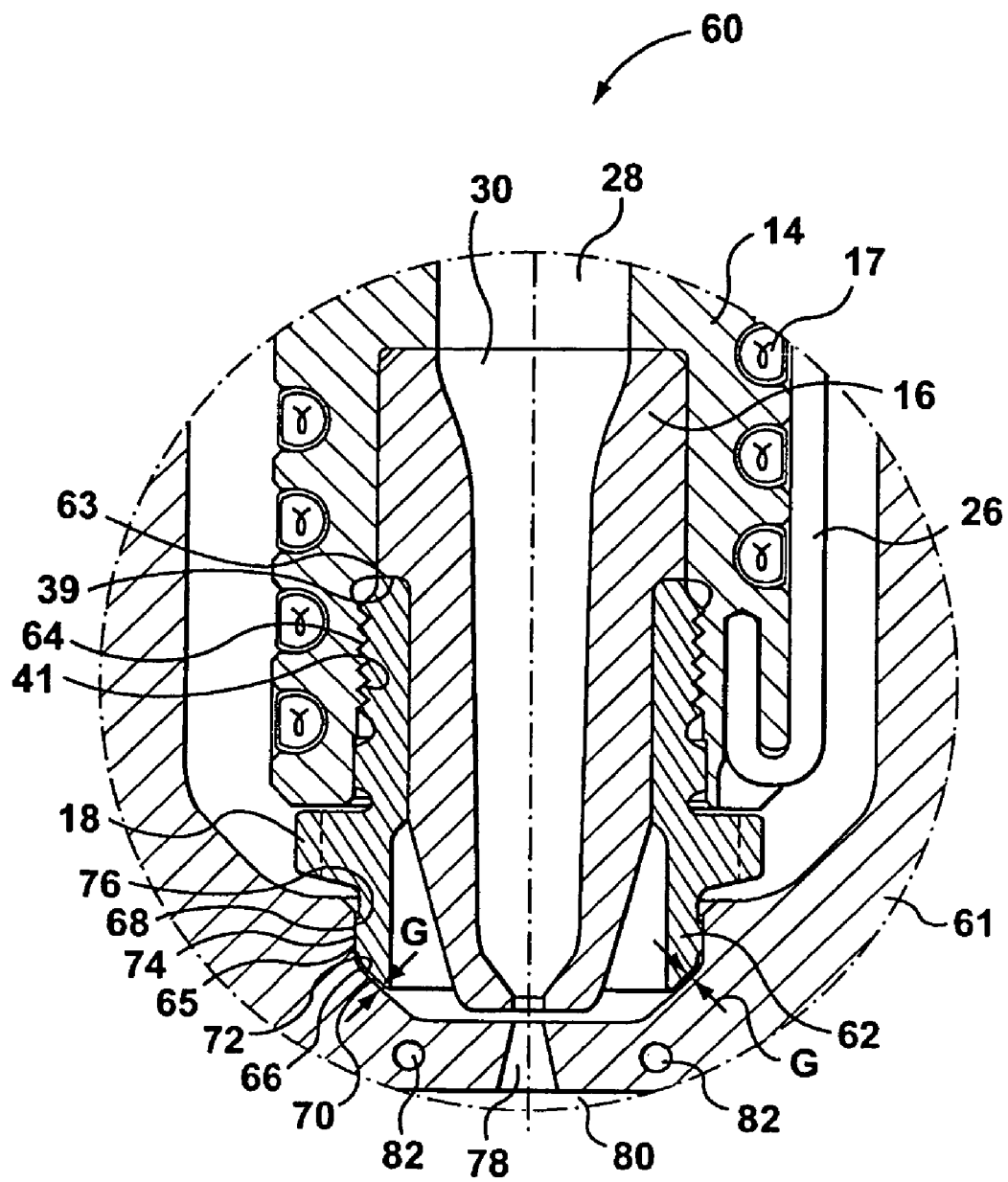
FIG. 3a is a sectional view of a portion of a nozzle in accordance with a second embodiment of the present invention.

Reference is made to FIG. 3a, which shows a nozzle 60 in accordance with a second embodiment of the present invention, in combination with a mold component 61.

Nozzle 60 is similar to nozzle 10 (FIG. 1), and includes the nozzle body 14, the tip 16, and the heater 17, and may include a tip surrounding piece 62 and a thermocouple 26. The tip surrounding piece 62 may be similar to the tip surrounding piece 18 (FIG. 1), and may have a jam surface 63 thereon which cooperates with the shoulder 39 on the tip 16 to retain the tip 16 in place in the nozzle body 14.

The tip surrounding piece 62 may include a tip surrounding piece threaded portion 64 that cooperates with the threaded portion 41 on the nozzle body 14, so that the tip surrounding piece 62 is removably attached to the nozzle body 14.

Figure 3B:
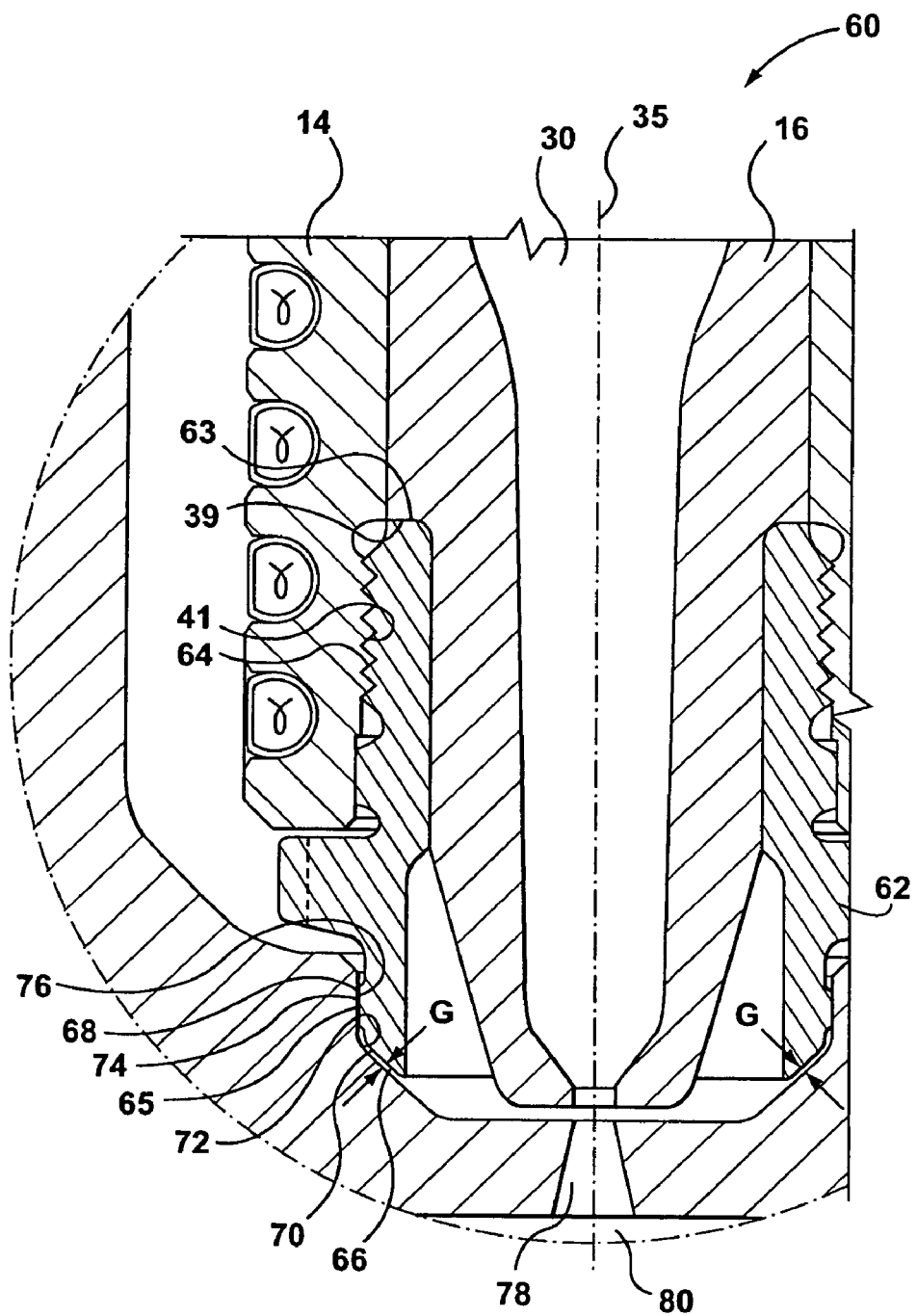
FIG. 3b is a magnified view of a sealing portion of the nozzle shown in FIG. 2.

The tip surrounding piece 62 cooperates with the mold component 61 to form a multi-portion seal 65 therebetween. The multi-portion seal 65 includes a gap seal 66 and also includes a second seal 68, which may be, for example, a mechanical seal, that is adjacent the gap seal 66. The gap seal 66 may be similar to the gap seal 48 (FIG. 1), and is formed by the cooperation of a first tip surrounding piece sealing surface 70 on the tip surrounding piece 62, with a first mold component sealing surface 72 on the mold component 61. The first tip surrounding piece sealing surface 70 and the first mold component sealing surface 72 are separated by the gap G, as shown more clearly in FIG. 3b. The first tip surrounding piece sealing surface 70 and the first mold component sealing surface 72 may be referred to as the first gap seal surface 70 and the second gap seal surface 72, respectively.

Because of the presence of the second seal 68, the gap G, in the embodiment shown in FIG. 3a may optimally be approximately 0.15 mm, and may be less than approximately 0.25 mm.

The second seal 68 may also be referred to as a supplementary seal 68, and is formed by the cooperation of a second tip surrounding piece sealing surface 74 on the tip surrounding piece 62, with a second mold component sealing surface 76 on the mold component 61. The sealing surfaces 74 and 76 may contact each other, as shown in FIG. 3a. The second tip surrounding piece sealing surface 74 and a second mold component sealing surface 76 may be referred to as the first supplementary seal surface 74 and the second supplementary seal surface 76 respectively.

The second seal 68 may be positioned behind the gap seal 66 with respect to the chamber 32, so that melt is exposed to the gap seal 66 before the second seal 68.

Because of the presence of the gap seal 66, the surface area of contact between the tip surrounding piece 62 and the mold component 61 along the sealing surfaces 74 and 76, is smaller than would be required if the second seal 68 acted alone to seal against melt leakage therepast. Thus, the heat transfer from the tip surrounding piece 62 and from the nozzle 60 in general, into the mold component 61 is reduced accordingly.

In addition to forming the second seal 68, the second sealing surfaces 74 and 76 may cooperate to align the nozzle 10 with respect to the gate, which is shown at 78. This applies particularly in the case, as shown in FIG. 3a, where the sealing surfaces 74 and 76 are substantially vertical surfaces. However, the second sealing surfaces 74 and 76 may be inclined instead of being vertical, and may still be adapted to align the nozzle 60 with respect to the gate 78.

Referring to FIG. 3a, the mold component 61 may be similar to the mold component 12 (FIG. 1), and defines a plurality of mold cavities 80, each of which has at least one gate 78 leading thereto. The mold component 61 may include cooling channels 82 for cooling of melt in the mold cavities 80.

Figure 3C:
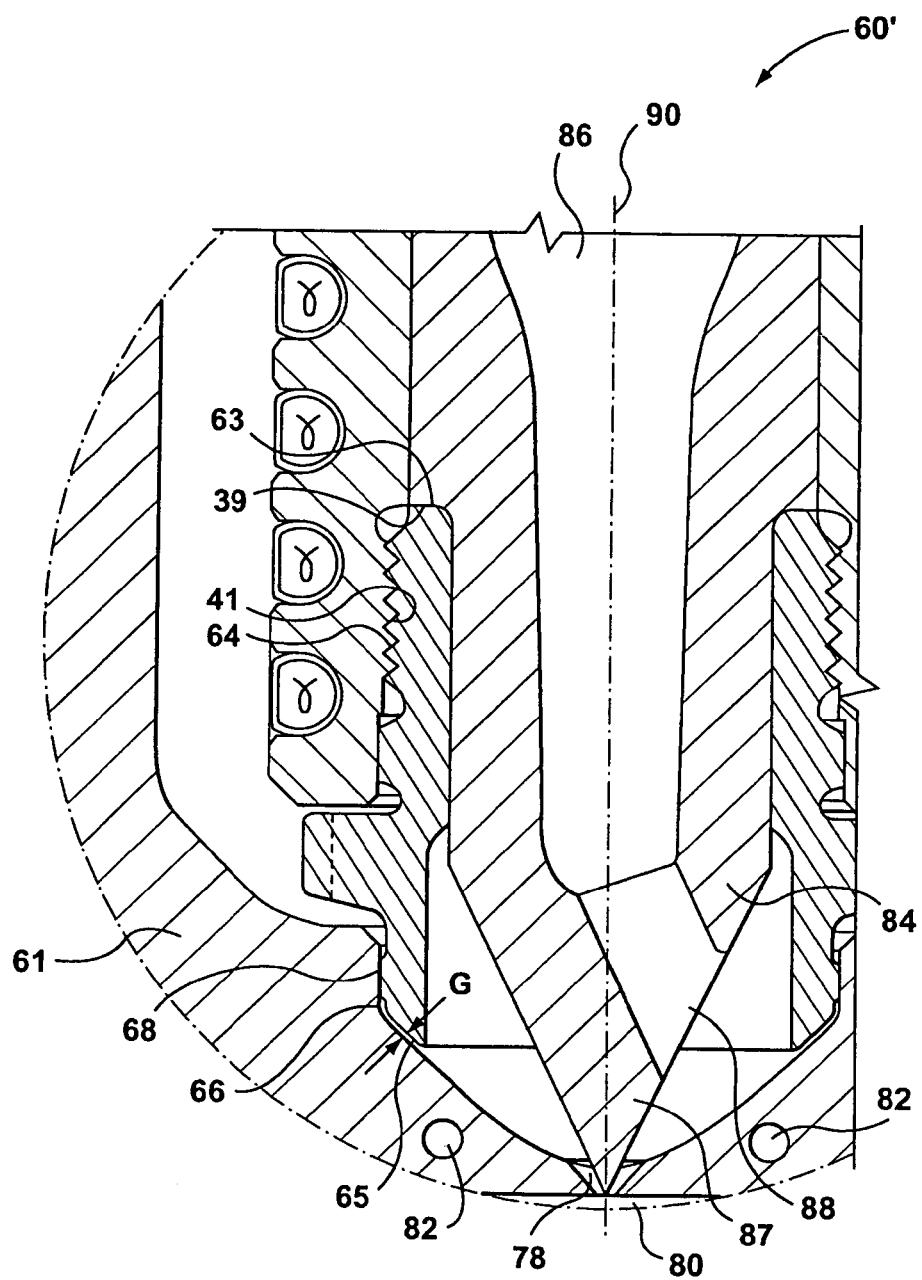
FIG. 3c is a sectional view of a portion of a nozzle in accordance with a third embodiment of the present invention.

Reference is made to FIG. 3c, which shows a variant 60' of the embodiment shown in FIG. 3a. In the nozzle 60', a tip 84 replaces the tip 16 (FIG. 3a). The tip 84 may be similar to the tip 16 (FIG. 3a) and may define a tip melt passage 86 therethrough. However, the tip 84 includes a torpedo portion 87, and the tip melt passage 86 may have an exit 88 that is off-center from the axis of the gate 78, which is shown at 90.

It will be noted that the tip 84 may also replace the tip 16 in the embodiment shown in FIGS. 1 and 2.

Figure 4:
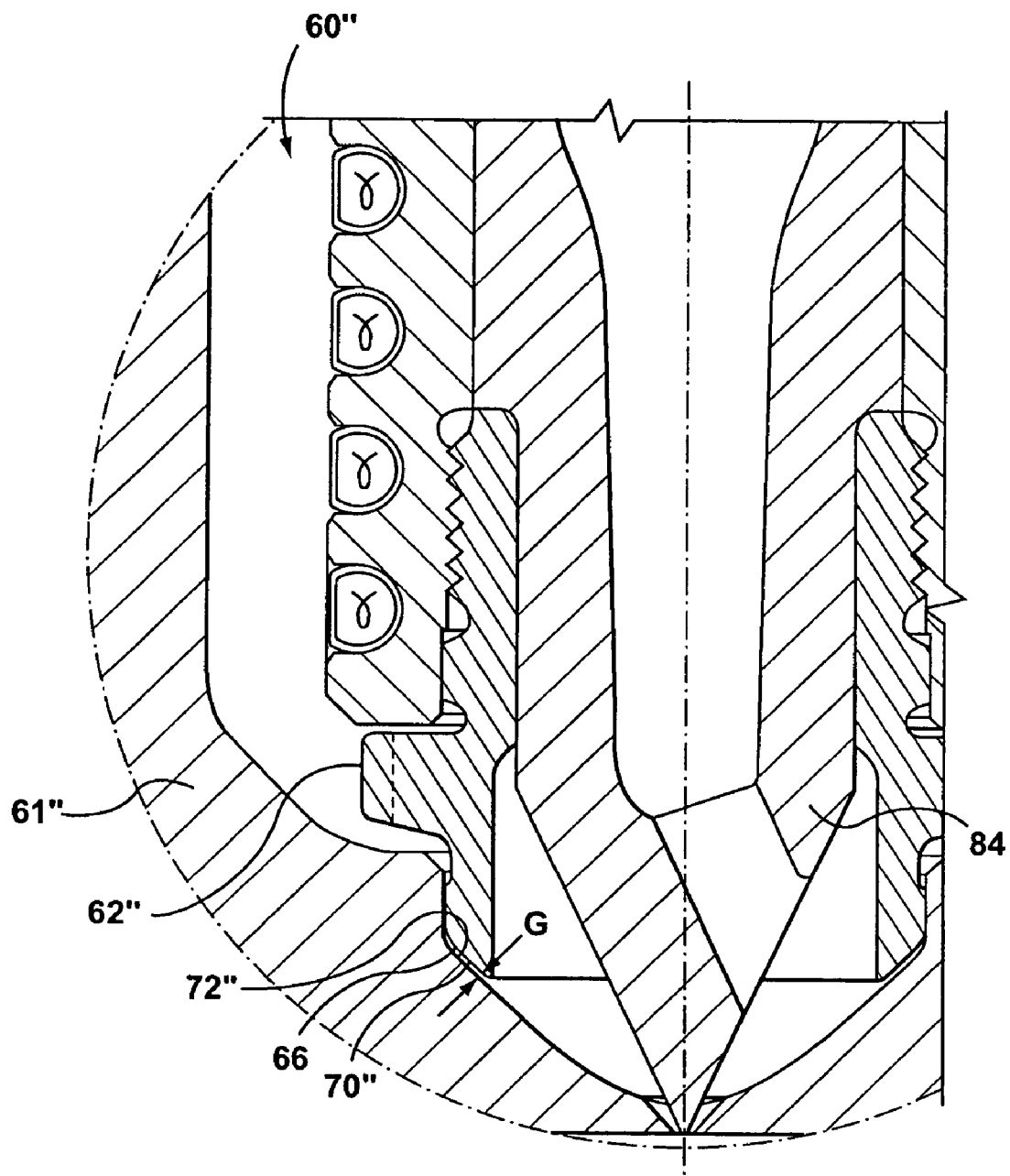
FIG. 4 is a sectional view of a portion of a nozzle in accordance with a fourth embodiment of the present invention.

Reference is made to FIG. 4, which shows another variant 60'' of the embodiment shown in FIG. 3a. In the variant shown in FIG. 4, the tip 84 replaces the tip 16 (FIG. 3a). The items shown in FIG. 4 are similar to those in FIG. 3a, except as follows. A gap seal 66' is formed which is similar to the gap seal 66 (FIG. 3a), except that the gap seal 66'' is formed between a first tip surrounding piece sealing surface 70'' on a tip surrounding piece 62'', and a first mold component sealing surface 72'' on a mold component 61''. The first sealing surfaces 70'' and 72'' may be entirely inclined surfaces in the embodiment shown in FIG. 4, whereas they are shown as including an inclined portion and a substantially vertical portion in the embodiment shown in FIG. 3a. The first sealing surfaces 70'' and 72'' may also be referred to as the first and second gap seal surfaces 70'' and 72'' respectively.

Figure 5:
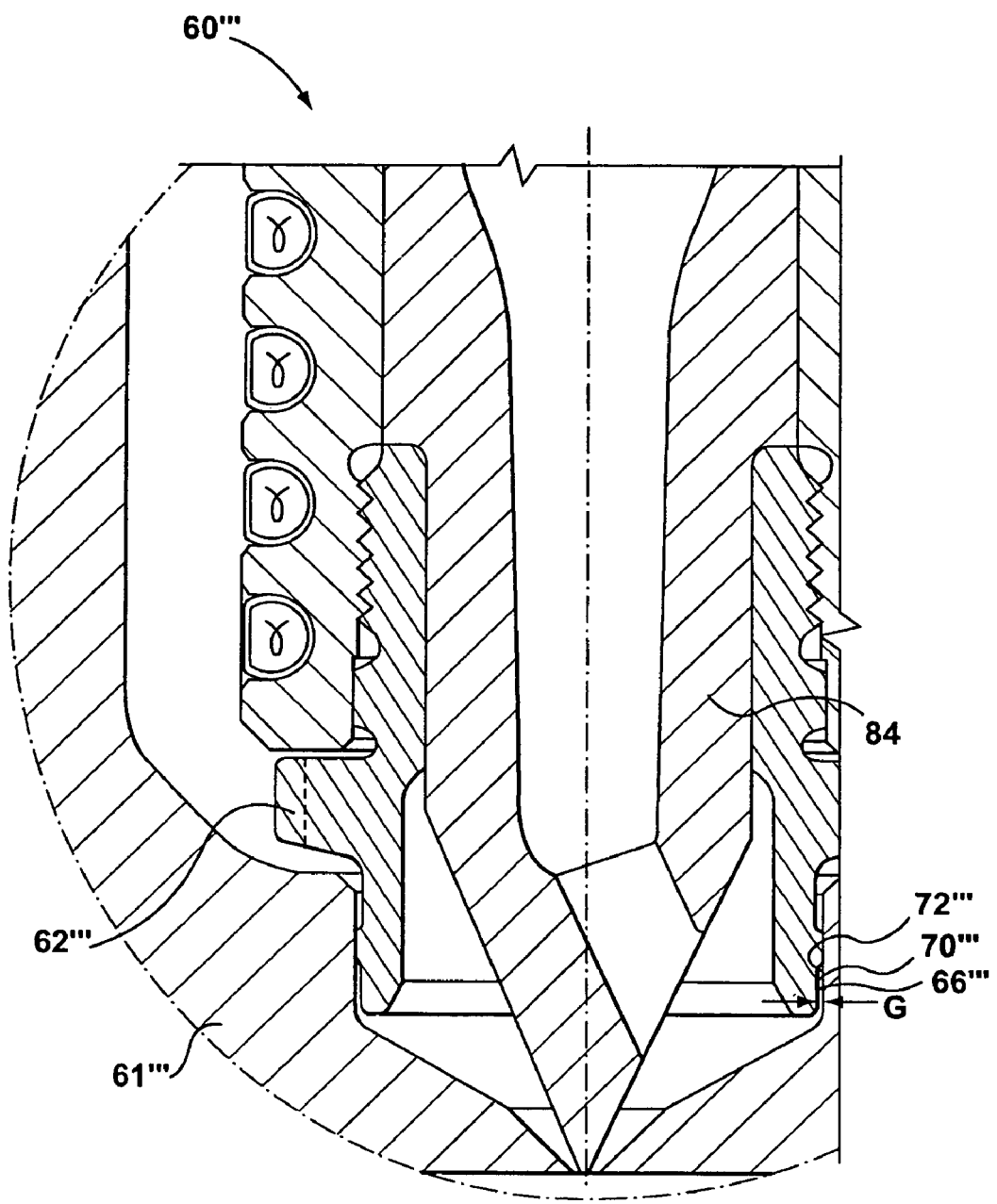
FIG. 5 is a sectional view of a portion of a nozzle in accordance with a fifth embodiment of the present invention.

Reference is made to FIG. 5, which shows yet another variant 60" of the embodiment shown in FIG. 3a. In the variant shown in FIG. 5, the tip 84 replaces the tip 16 (FIG. 3a). The items shown in FIG. 5 are similar to those in FIG. 3a, except as follows. A gap seal 66" is formed which is similar to the gap seal 66 (FIG. 3a), except that the gap seal 66" is formed between a first tip surrounding piece sealing surface 70" on a tip surrounding piece 62", and a first mold component sealing surface 72" on a mold component 61". The first sealing surfaces 70" and 72" may be substantially vertical surfaces in the embodiment shown in FIG. 5, whereas they are shown as including an inclined portion and a substantially vertical portion in the embodiment shown in FIG. 3a. The first sealing surfaces 70" and 72" may also be referred to as the first and second gap seal surfaces 70" and 72" respectively.

Figure 6:
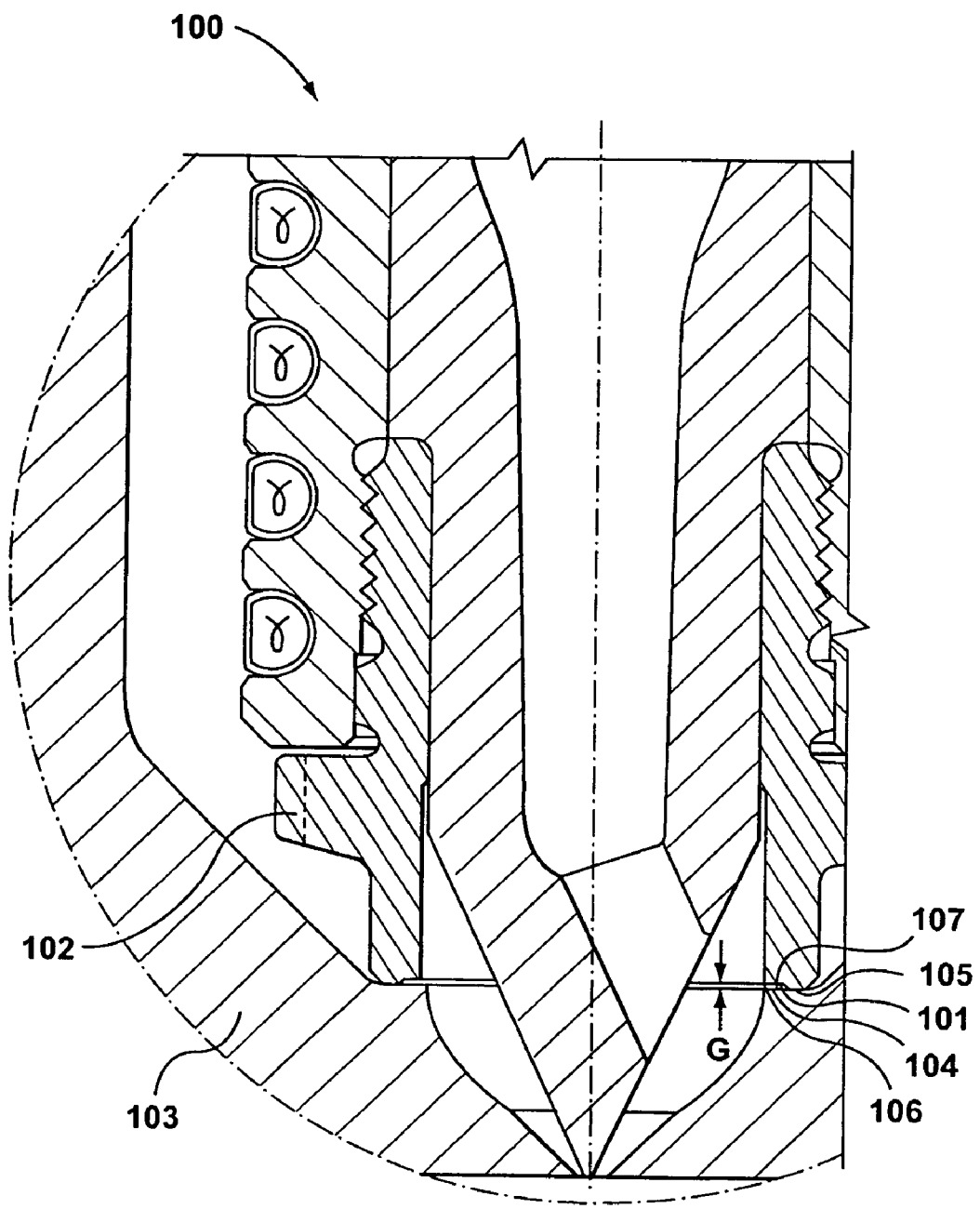
FIG. 6 is a sectional view of a portion of a nozzle in accordance with a sixth embodiment of the present invention.

Reference is made to FIG. 6, in which a nozzle 100 is shown in accordance with an alternative embodiment of the present invention. The nozzle 100 may be similar to the nozzle 60 (FIG. 3a), and may include a multi-portion seal 101 between a tip surrounding piece 102 and a mold component 103.

The multi-portion seal 101 includes a gap seal 104 and a second seal 105. The gap seal 101 is made by a first tip surrounding piece sealing surface 106 on the tip surrounding piece 102 cooperating with a first mold component sealing surface 107 on the mold component 103.

In this embodiment, the sealing surfaces 106 and 107 may be substantially horizontal as shown, and are separated by the gap G. The sealing surfaces 106 and 107 may also be referred to as the first and second gap seal surfaces 106 and 107 respectively. In this embodiment, a separate alignment means (not shown) may be included if desired.

It will be noted that the nozzle 100 may optionally not include the second seal 105, and have only the gap seal 101 with the mold component 103.

Figure 7:
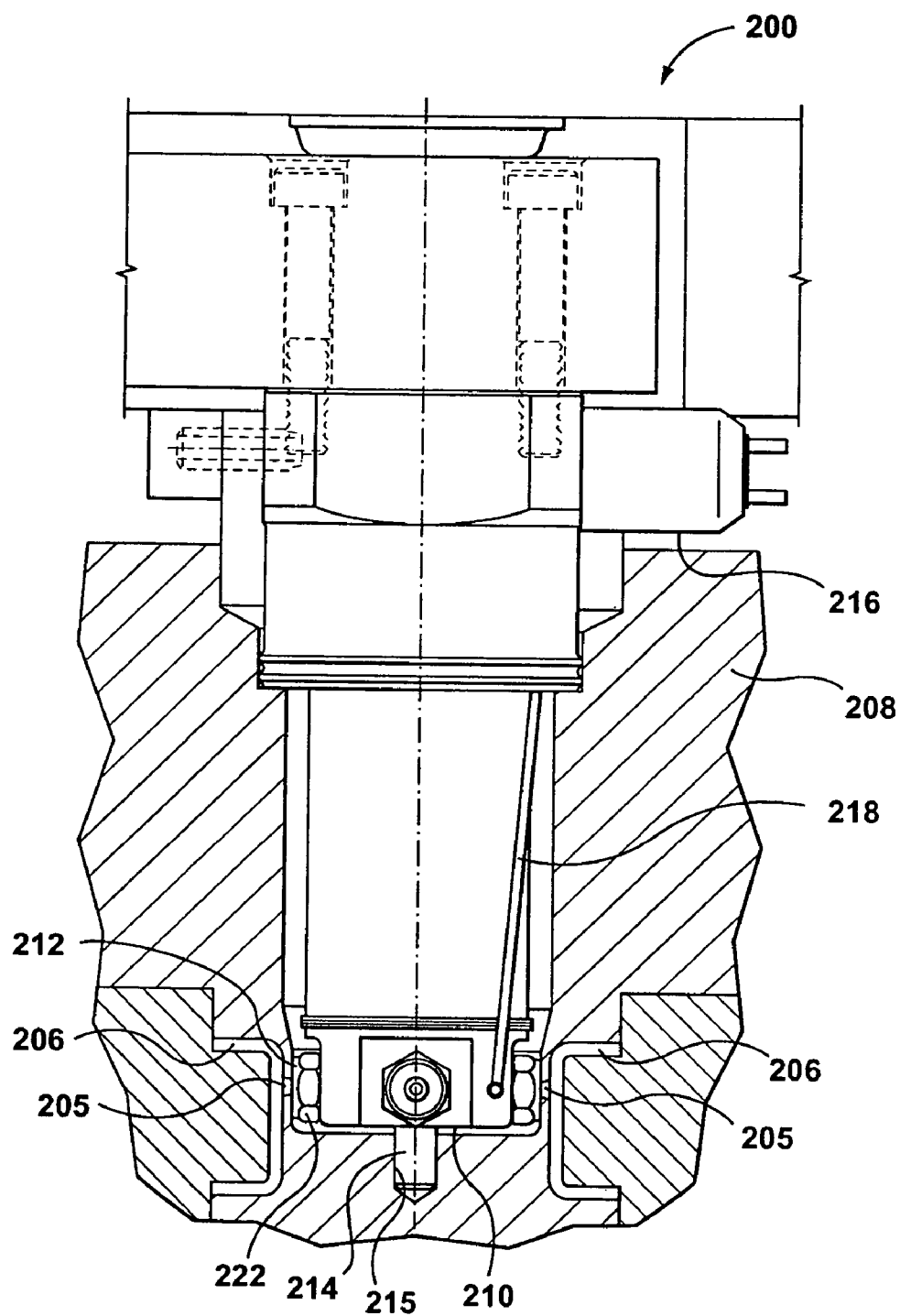
FIG. 7 is a side view of a nozzle in accordance with a seventh embodiment of the present invention.
Figure 8:
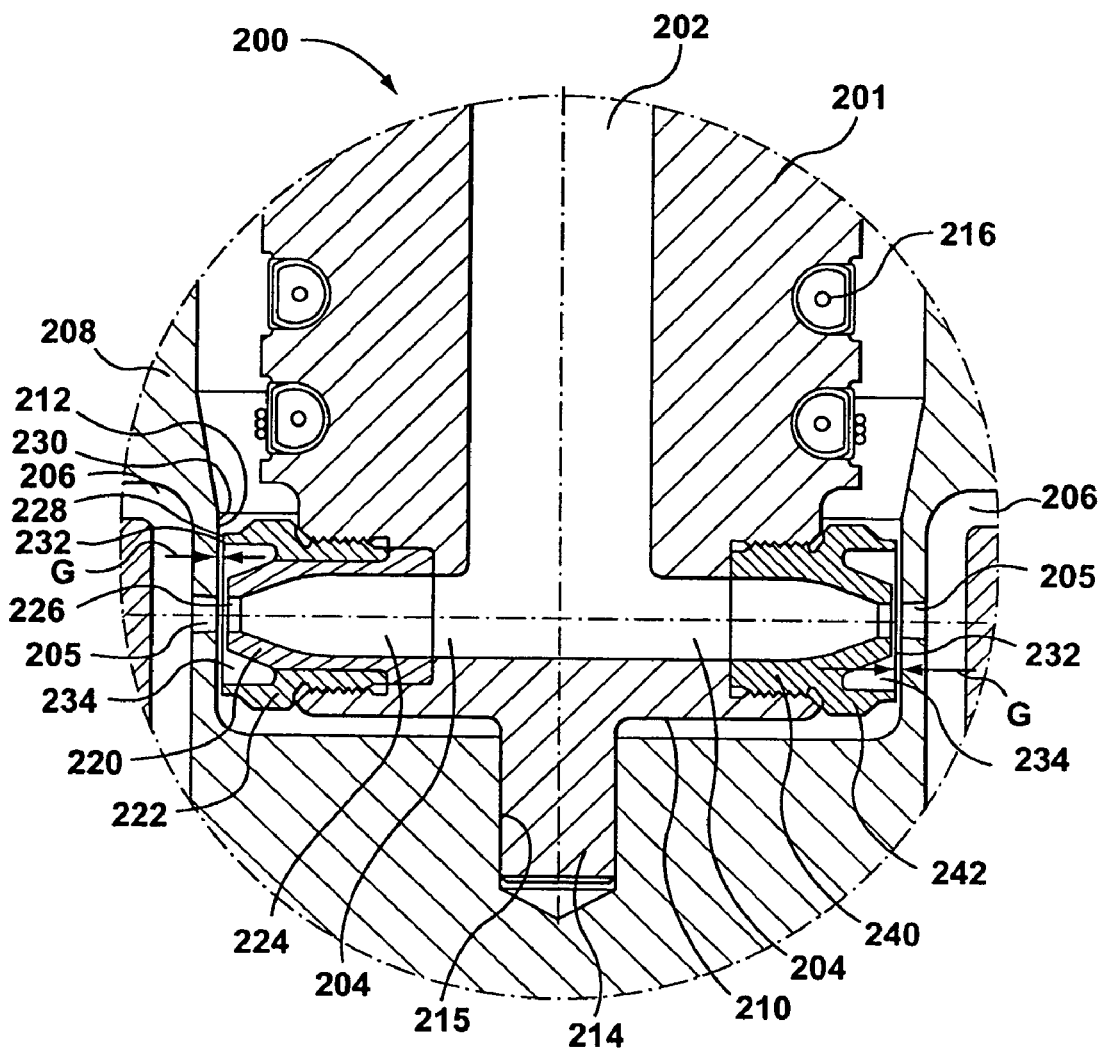
FIG. 8 is a sectional view of a portion of the nozzle shown in FIG. 7.

Reference is made to FIGS. 7 and 8, which show a nozzle 200. Nozzle 200 is similar to nozzle 10, but is an edge-gated nozzle. Nozzle 200 includes a nozzle body 201 having a nozzle melt passage 202, which divides into a plurality of the melt passage portions 204 (FIG. 8). Nozzle 200 is for feeding melt through a plurality of gates 205 into a plurality of mold cavities 206, in a mold component 208. Nozzle 200 has an end 210, which may be positioned in a bore 212 in the mold component 208, for transferring melt into the mold cavities 206. On the end 210, is mounted a guide piece 214. The guide piece 214 fits within a guide aperture 215 for aligning the end 210 of nozzle 200 in the bore 212. The nozzle 200 may include a heater 216 and a thermocouple 218 (FIG. 7).

Referring to FIG. 8, each nozzle melt passage portion 204 has therewith a nozzle tip 220 and a tip surrounding piece 222. The tip 220 and the tip surrounding piece 222 may mount to the nozzle body 201, in a similar manner to tip 16 and tip surrounding piece 18 to nozzle body 14 (FIG. 1). The tip 220 includes a tip melt passage 224 in communication with a nozzle melt passage portion 204, and has an exit 226. The tip surrounding piece 222 may include a tip surrounding piece sealing surface 228 that surrounds exit 226 and gate 205, and is positioned at a gap G from a mold component sealing surface 230 on the mold component 208, forming a gap seal 232 therewith. A chamber 234 is defined between the tip 220 and the gate 205. The tip surrounding piece sealing surface 228 and the mold component sealing surface 230 may be referred to as the first and second gap seal surfaces 228 and 230 respectively.

Melt passes through nozzle melt passage 202, melt passage portions 204, tip melt passages 224, out from exits 226 into chambers 234, through gates 205 and into mold cavities 206. Melt is inhibited from escaping from chamber 234 by the gap seal 232.

Nozzle 200 may include an alternative tip 240 and tip surrounding piece 242 which are integrally joined, forming a single piece, instead of tip 220 and tip surrounding piece 222, or may include some of each type of tip and tip surrounding piece.

Figure 9:
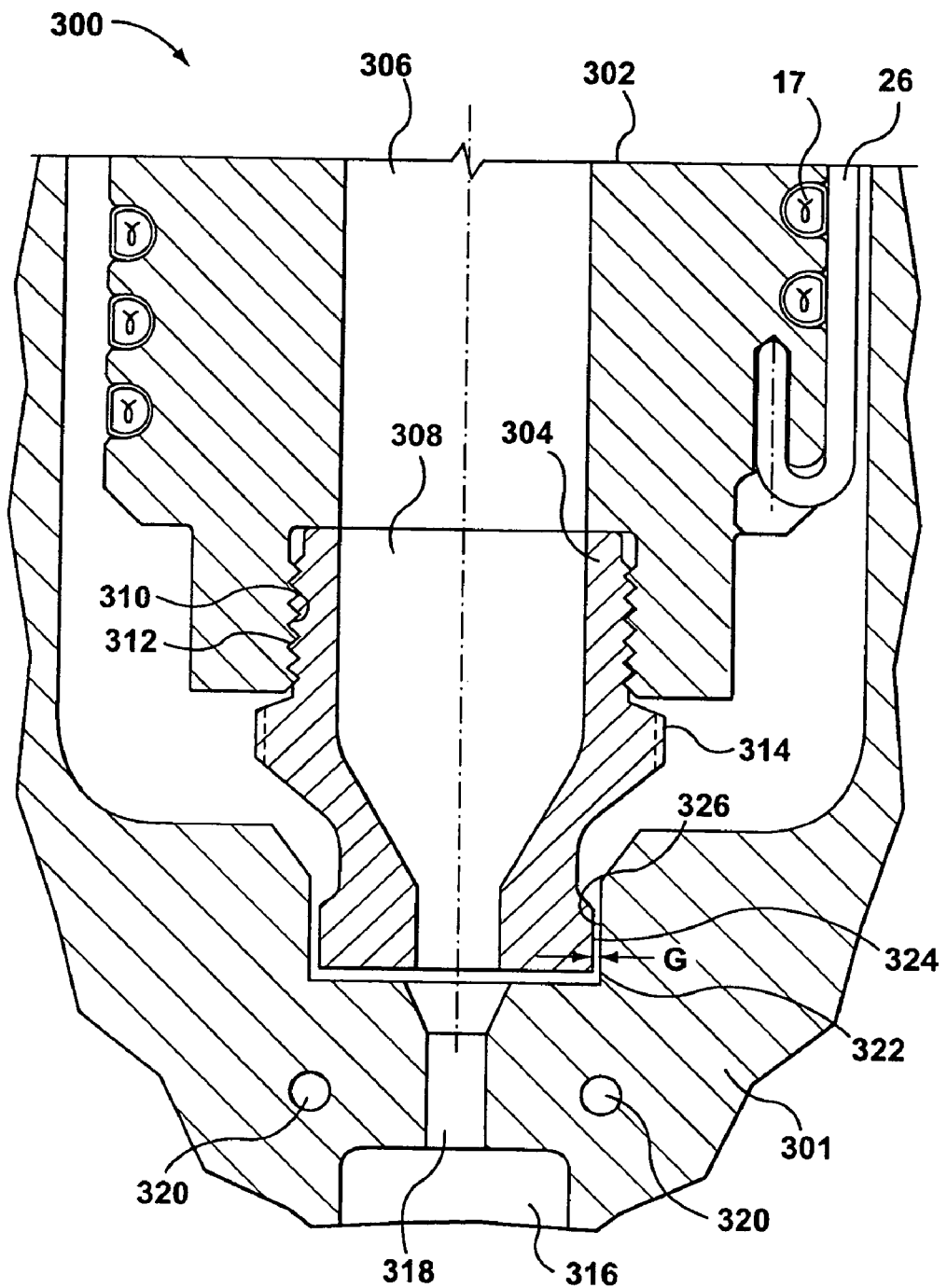
FIG. 9 is a sectional view of a portion of a nozzle in accordance with an eighth embodiment of the present invention.

Reference is made to FIG. 9, which shows a nozzle 300 in accordance with another embodiment of the present invention, in combination with a mold component 301. The nozzle 300 may be similar to nozzle 10 (FIG. 1), and includes a nozzle body 302, the heater 17, a tip 304 and may optionally include the thermocouple 26. The nozzle body 302 defines a nozzle body melt passage 306 therethrough. The heater 17 may be positioned on the nozzle body 302 in any suitable way, for heating melt in the nozzle body melt passage 306.

The tip 304 may be similar to the tip 16 (FIG. 1) and defines a tip melt passage 308 therethrough. The tip 304 may be removably connected to the nozzle body 302 in any suitable way, so that the tip melt passage 308 is in fluid communication with and downstream from the nozzle body melt passage 306. The tip 304 may, for example, have a tip threaded portion 310 for mating with a nozzle body threaded portion 312 on the nozzle body 302. The tip may further include a tip tool engagement portion 314 for receiving a tool (not shown), for the installation and removal of the tip 304 with respect to the nozzle body 302.

The mold component 301 defines a plurality of melt cavities 316, each of which has at least one gate 318 leading thereto. A plurality of cooling channels 320 may be included in the mold component 301 to cool melt in the mold cavities 316.

A gap seal 322 may be formed by the cooperation of the tip sealing surface 324 and a mold component sealing surface 326, which are separated by the gap G. The tip sealing surface 324 and the mold component sealing surface 326 may also be referred to as the first and second gap seal surfaces 324 and 326 respectively.

The tip can be manufactured by any of the materials that are used for the tip 16 (FIG. 1), however, it may be advantageous to use a material other than Tungsten Carbide, due to the existence of the threaded portion 310 on the tip 304.

Figure 10:
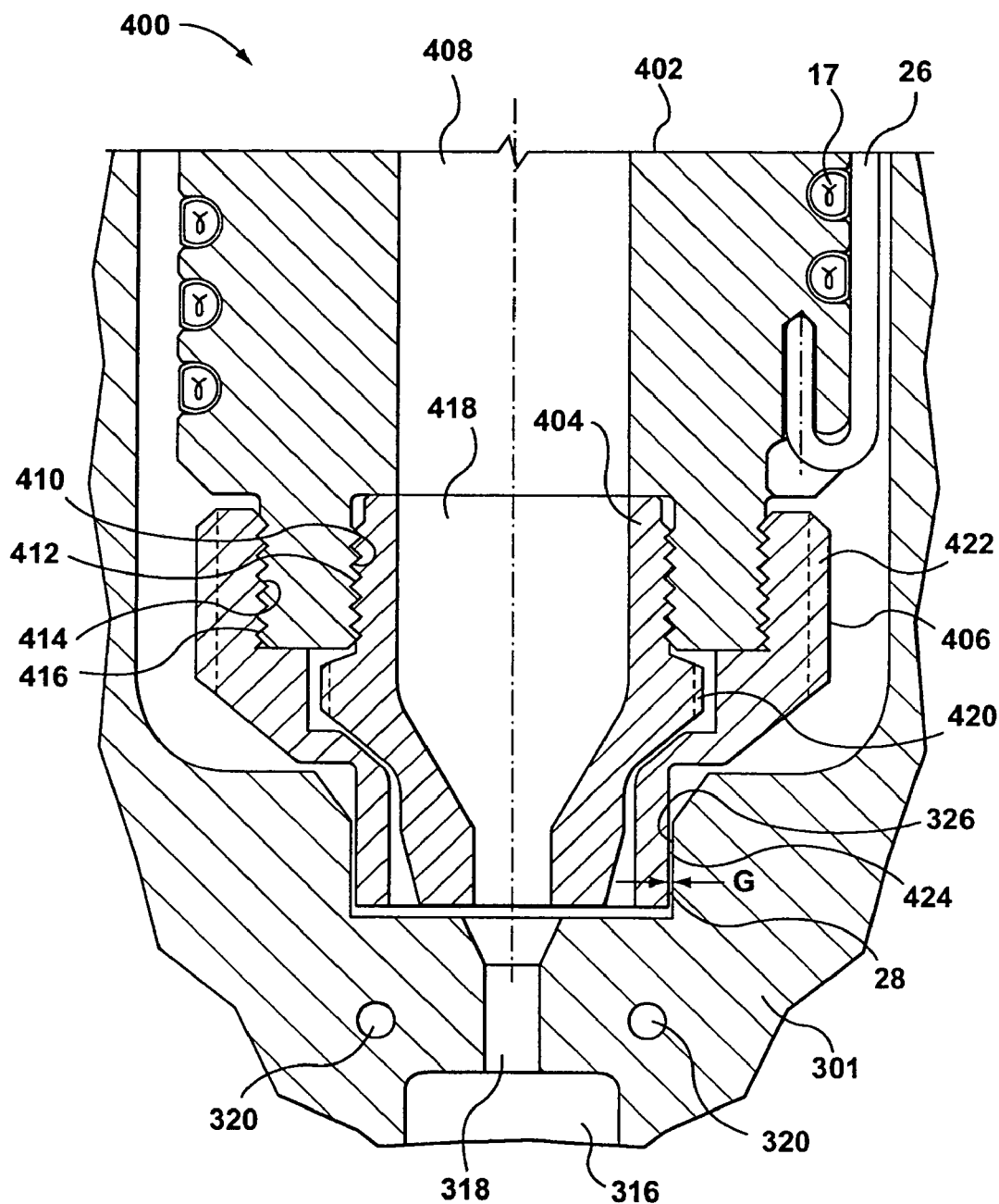
FIG. 10 is a sectional view of a portion of a nozzle in accordance with a ninth embodiment of the present invention.

Reference is made to FIG. 10, which shows a nozzle 400 in accordance with another embodiment of the present invention, in combination with the mold component 301. The nozzle 400 may be similar to the nozzle 300 and includes a nozzle body 402, the heater 17, a tip 404, a tip surrounding piece 406 and may optionally include the thermocouple 26. The nozzle body 402 may be similar to the nozzle body 302 (FIG. 9), and defines a nozzle body melt passage 408 therethrough. The nozzle body 402 also includes a first nozzle body threaded portion 410 for mating with a tip threaded portion 412 on the tip 404. The nozzle body 402 also includes a second nozzle body threaded portion 414 for mating with a tip surrounding piece threaded portion 416 on the tip surrounding piece 406. The tip 404 may be similar to the tip 304 and defines a melt passage 418 therethrough. The tip 404 may also include a tip tool engagement portion 420 for receiving a tool (not shown). In the embodiment shown in FIG. 10, the tip 404 is removably connected to the nozzle body 402 by means of the cooperation of threaded portions 416 and 410.

The tip surrounding piece 406 may be similar to the tip surrounding piece 18 (FIG. 1), except that the threaded portion 414 on the tip surrounding piece 406 may be an internally threaded portion, instead of an externally threaded portion, and except that the tip surrounding piece 406 does not retain the tip 404 in place.

The tip surrounding piece 406 may include a tip surrounding piece tool engagement portion 422 for receiving a tool (not shown).

The tip surrounding piece 406 has a tip surrounding piece sealing surface 424, which cooperates with the mold component sealing surface 326 to form a gap seal 428 therewith. The sealing surfaces 424 and 326 are separated by the gap G, which inhibits melt leakage therebetween. The sealing surfaces 424 and 326 may also be referred to as the first and second gap seal surfaces 424 and 326 respectively.

Figure 11:
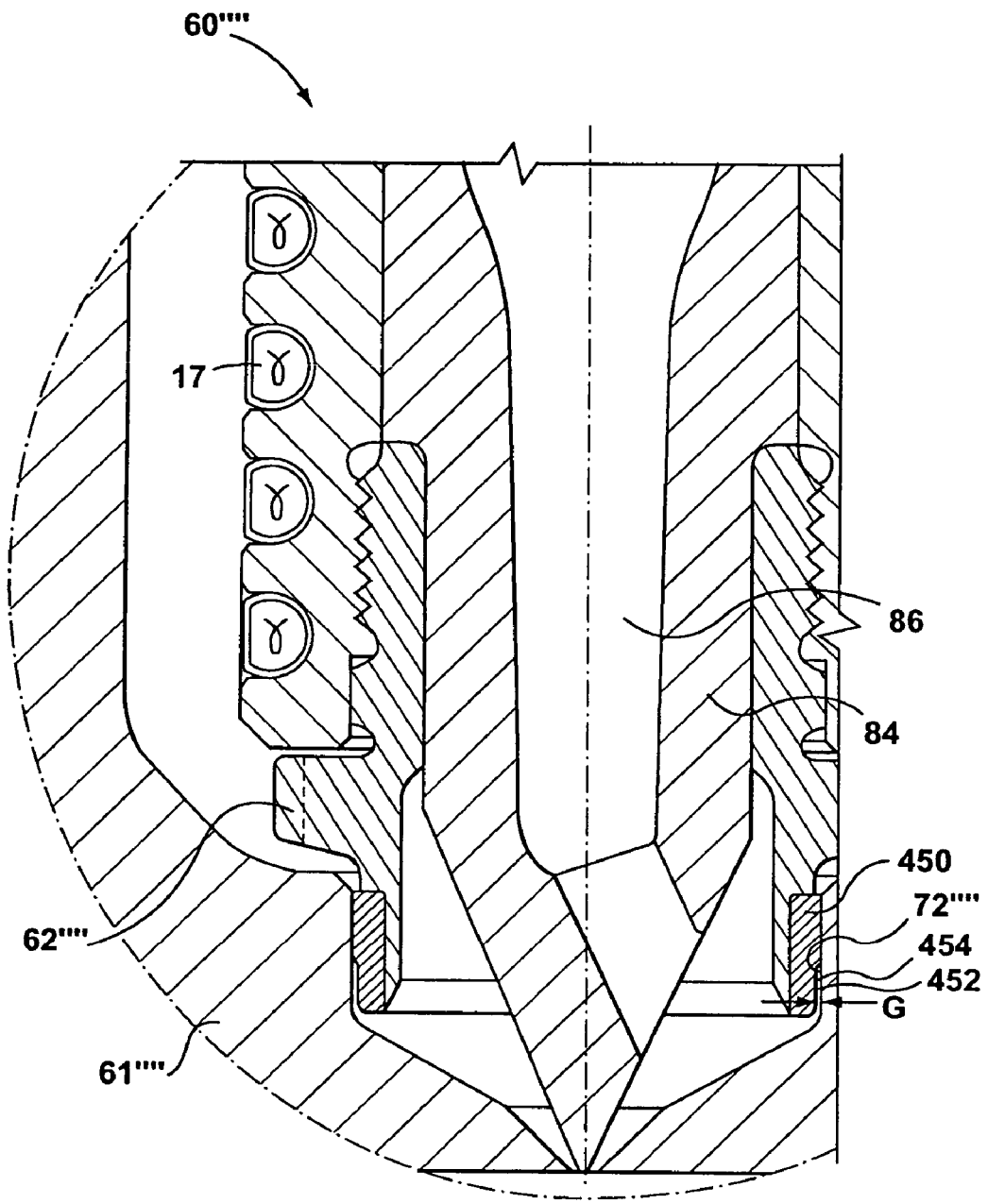
FIG. 11 is a sectional view of a portion of a nozzle in accordance with a tenth embodiment of the present invention.

Reference is made to FIG. 11, which shows a nozzle 60", in combination with a mold component 61", in accordance with a variant of the nozzle 60" and mold component 61" shown in FIG. 5. The nozzle 60" may be similar to the nozzle 60" with the exception that a tip surrounding piece 62" on the nozzle 60" includes a seal piece 450 thereon. The seal piece 450 may be a band that surrounds the outer surface of the tip surrounding piece 62", and forms a gap seal 452 with the mold component 61". The seal piece 450 has a sealing surface before that mates with mold component sealing surface 72" to form the gap seal 452. The sealing surfaces 454 and 72" are separated by the gap G, which inhibits melt leakage therepast. The sealing surfaces 454 and 72" may also referred to as the first and second gap seal surfaces 454 and 72" respectively.

The seal piece 450 may be made from a material that has a lower thermal conductivity than that of the tip surrounding piece 62". The seal piece 450 may, for example, be made from titanium, H13, stainless steel, mold steel or chrome steel. Other alternative materials include ceramics and plastics. The seal piece 450 may, instead of being a separate piece that is joined to the tip surrounding piece 62", be a coating or layer that is applied to a portion of the outside surface of the tip surrounding piece 62".

The tip surrounding piece 62" may be positioned, at least in part, between the heater and the tip melt passage 86. It may be advantageous in the case shown in FIG. 11, for the tip surrounding piece 62" to be made from a material that is generally equally thermally conductive as the material of the tip 84. The seal piece 450 reduces the heat transfer between the tip surrounding piece 62" and the mold component 61", by being made from a material that has a lower thermal conductivity than that of the tip surrounding piece 62".

Figure 12:
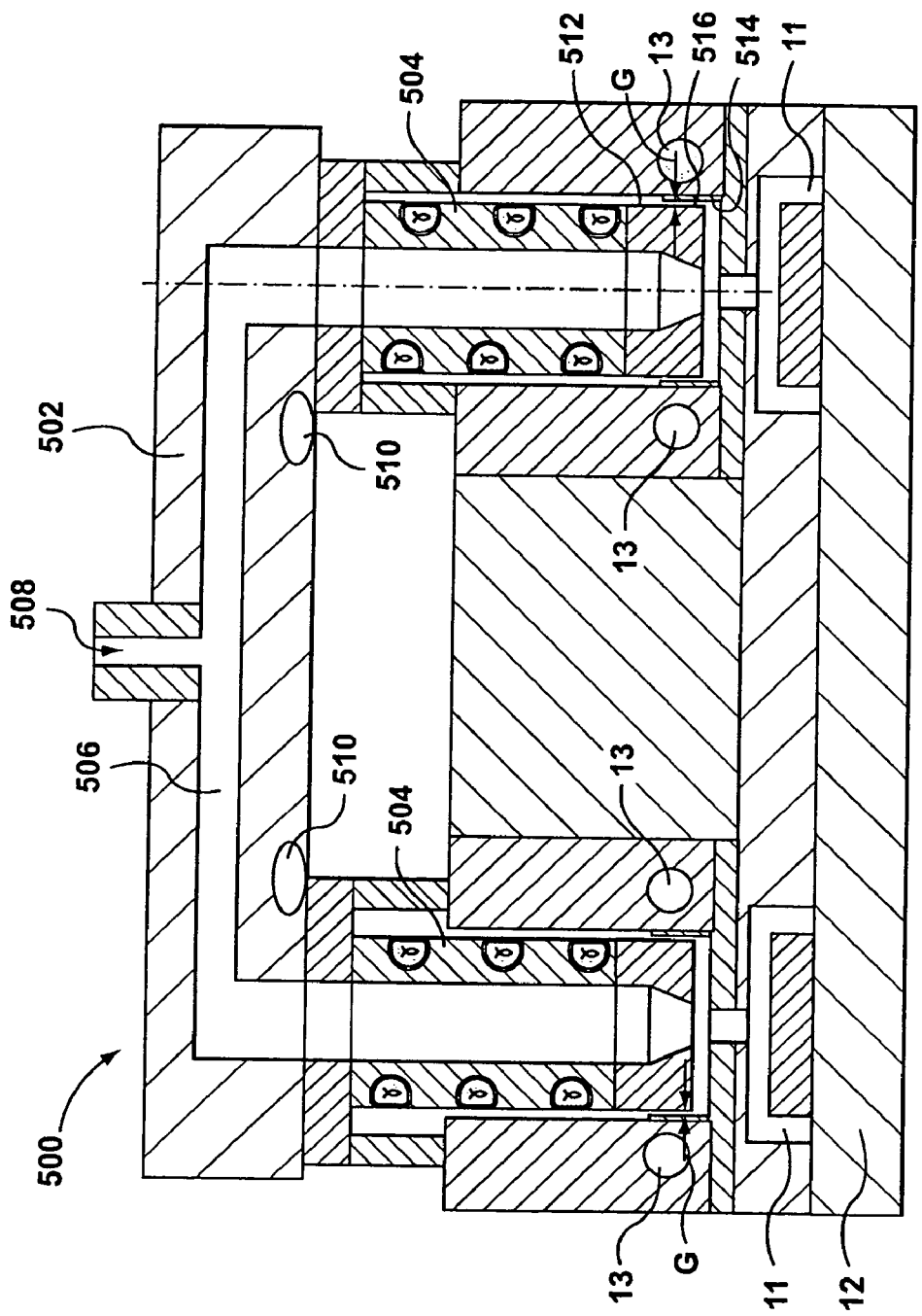
FIG. 12 is a sectional view of an injection molding apparatus incorporating a nozzle in accordance with an eleventh embodiment of the present invention.

Reference is made to FIG. 12, which shows an injection molding apparatus 500, that includes a runner component 502, the mold component 12 and a plurality of nozzles 504 in accordance with the present invention.

The runner component 502 includes a plurality of runners 506 which transfer melt from a main runner inlet 508 to the nozzles 504. The runner component 502 may be heated by a heater 510.

The nozzles 504 transfer melt from the runner component 502 to the mold component 12. The nozzles 504 may be any of the nozzle embodiments and variants described above and shown in FIGS. 1–11, and include a nozzle sealing surface 512 that is separated from a mold component sealing surface 514 by the gap G to form a gap seal 516 therewith. The nozzle sealing surface 512 and the mold component sealing surface 514 may also be referred to as the first and second gap seal surfaces 512 and 514 respectively. The nozzle sealing surface 512 may be positioned on any suitable portion or component of the nozzle 504.

A particular example of an injection molding apparatus is shown in FIG. 12. It will be appreciated that the injection molding apparatus that incorporates the gap seal of the present invention may be any suitable type of injection molding apparatus and is not limited to the example shown.

It will be appreciated that the first and second gap seal surfaces that make up the gap seal of the present invention, may be surfaces on any component of the nozzle and mold component respectively, and are not limited to the examples shown and described herein. For greater certainty, the first gap seal surface may be positioned on any suitable structure that is part of the nozzle, and is therefore connected at least indirectly to the nozzle body.

Thermal expansion and contraction during a molding cycle must be considered during the construction of the nozzles described above, so that the gap G is within the ranges given above when the nozzle feeds melt into the gate.

It will be appreciated that it may be advantageous to size the gap G so as to reduce to a desired level, the amount of heat lost from the nozzle.

It will be appreciated that the particular configuration of the gap seal portion may be selected depending on the specific molding application, including the Theological properties of the melt, such as its viscosity at the injection temperature. It is contemplated that the invention can be applied to nozzles with types of melt other than those types of melt specifically disclosed herein.

While the above description constitutes the preferred embodiments, it will be appreciated that the present invention is susceptible to modification and change without departing from the fair meaning of the accompanying claims.

That which is claimed is:

1. An injection molding apparatus comprising:
   a manifold, including at least one runner that receives melt from a melt source;
   a nozzle in fluid communication with the runner of the manifold, the nozzle including,
      a nozzle body having a melt passage therethrough,
      a nozzle tip having an outer surface and a tip melt passage therethrough, wherein the tip melt passage is in fluid communication with the melt passage of the nozzle body and,
      a tip surrounding piece that is removably coupled to the nozzle body and retains the nozzle tip in position with respect to the nozzle body, the tip surrounding piece including an inner surface, wherein at least a portion of the inner surface of the tip surrounding piece is at a distance from the outer surface of the nozzle tip to thereby define a chamber, and wherein the tip surrounding piece is formed of a material that has a thermal conductivity that is substantially equal to that of the nozzle tip;
   a heat source thermally coupled to said nozzle; and,
   a mold component having a mold cavity for receiving melt from said nozzle through a mold gate.

2. The injection molding apparatus defined in claim 1, wherein the nozzle tip includes a retaining surface and the tip surrounding piece includes a support surface, said support surface of the tip surrounding piece abutting the retaining surface of the nozzle tip to thereby retain the nozzle tip in position with respect to the nozzle body.

3. The injection molding apparatus defined in claim 2, wherein the retaining surface of the nozzle tip is a shoulder and the support surface of the tip surrounding piece takes the form of a jam surface.

4. The injection molding apparatus defined in claim 2, wherein the tip surrounding piece is threadably engaged with the nozzle body.

5. The injection molding apparatus defined in claim 1, wherein the tip melt passage has a longitudinal axis and an exit that is concentric with the axis.

6. The injection molding apparatus defined in claim 1, wherein the tip melt passage has a longitudinal axis and an exit that is off-center from the axis.

7. The injection molding apparatus defined in claim 6, wherein the nozzle tip is formed of H13.

8. The injection molding apparatus defined in claim 7, wherein the tip surrounding piece is formed of H13.

9. The injection molding apparatus defined in claim 1, wherein the nozzle tip is formed of H13.

10. The injection molding apparatus defined in claim 9, wherein the tip surrounding piece is formed of H13.

11. An injection molding apparatus comprising:
a manifold, including at least one runner that receives melt from a melt source;
a heat source for heating the melt;
a nozzle in fluid communication with the manifold, the nozzle including,
a nozzle body including a melt passage therethrough,
a nozzle tip, including a tip melt passage therethrough, wherein the tip melt passage is in fluid communication with the melt passage of the nozzle body, and
a tip surrounding piece that is removably coupled to the nozzle body and retains the nozzle tip in position with respect to the nozzle body, wherein the tip surrounding piece is formed of a material that has a thermal conductivity that is equivalent to that of the nozzle tip; and,
a mold component having a mold cavity for receiving melt from said nozzle.

12. The injection molding apparatus defined in claim 11, wherein the nozzle tip includes a retaining surface and the tip surrounding piece includes a support surface, the support surface of the tip surrounding piece abutting the retaining surface of the nozzle tip to thereby retain the nozzle tip in position with respect to the nozzle body.

13. The injection molding apparatus defined in claim 12, wherein the retaining surface of the nozzle tip is a shoulder and the support surface of the tip surrounding piece is a jam surface.

14. The injection molding apparatus defined in claim 11, wherein the tip surrounding piece is threadably engaged with the nozzle body.

15. The injection molding apparatus defined in claim 11, wherein the tip surrounding piece includes an inner surface, the nozzle tip includes an outer surface, and wherein at least a portion of the inner surface of the tip surrounding piece is at a distance from the outer surface of the nozzle tip, to thereby define a chamber.

16. The injection molding apparatus defined in claim 11, wherein the nozzle tip is formed of H13.

17. The injection molding apparatus defined in claim 15, wherein the tip surrounding piece is formed of H13.

18. An injection molding apparatus comprising:
a manifold including at least one runner that receives melt from a melt source; and,
a nozzle fluidly connecting the runner to a gate of a mold cavity, the nozzle including:
a nozzle body, defining a body melt passage, wherein the body melt passage is in fluid communication with the runner,
a nozzle tip, defining a tip melt passage, wherein the tip melt passage is in fluid communication with the body melt passage, and,
a tip surrounding piece that is removably coupled to the nozzle body and retains the nozzle tip in position with respect to the nozzle body, wherein the tip surrounding piece is formed of a material that has a thermal conductivity that is equivalent to that of the nozzle tip.

19. The injection molding apparatus defined in claim 18, further comprising: a heater thermally coupled to the nozzle.

20. The injection molding apparatus defined in claim 18, further comprising: a mold plate, wherein the tip surrounding piece touches the mold plate to thereby form a seal.

21. The injection molding apparatus defined in claim 18, wherein the tip surrounding piece includes an inner surface, the nozzle tip includes an outer surface, and a portion of the inner surface of the tip surrounding piece is at a distance from the outer surface of the nozzle tip to thereby define a chamber.

22. The injection molding apparatus defined in claim 18, wherein the tip surrounding piece is threadably engaged with the nozzle body.

23. The injection molding apparatus defined in claim 18, wherein the nozzle tip includes a shoulder which abuts with the tip surrounding piece to thereby retain the nozzle tip in position with respect to the nozzle body.

24. An injection molding apparatus comprising:
a manifold, including at least one runner that receives melt from a melt source;
a nozzle in fluid communication with the runner of the manifold, the nozzle including,
a nozzle body including a body melt passage therethrough,
a nozzle tip, including a tip melt passage therethrough, the nozzle tip being formed of a metallic material, and wherein the tip melt passage is in fluid communication with the body melt passage, and
a tip surrounding piece that is removably coupled to the nozzle body and retains the nozzle tip in position with respect to the nozzle body, the tip surrounding piece being formed of said metallic material;
a heat source thermally coupled to said nozzle; and,
a mold component having a mold cavity for receiving melt from said nozzle through a mold gate.

25. The injection molding apparatus defined in claim 24, wherein the metallic material is thermally conductive and wear resistant.

26. The injection molding apparatus defined in claim 24, wherein the metallic material is Beryllium-Copper.

27. The injection molding apparatus defined in claim 24, wherein the metallic material is tool steel.

28. The injection molding apparatus defined in claim 24, wherein the metallic material is H13.

29. The injection molding apparatus defined in claim 24, wherein the metallic material is Tungsten Carbide.

30. The injection molding apparatus defined in claim 24, wherein the tip surrounding piece is threadably engaged with the nozzle body.

31. The injection molding apparatus defined in claim 30, wherein the nozzle tip includes a shoulder which abuts with the tip surrounding piece to thereby retain the nozzle tip in position with respect to the nozzle body.

32. The injection molding apparatus defined in claim 31, wherein the tip surrounding piece includes an inner surface, the nozzle tip includes and outer surface, and a portion of the inner surface of the tip surrounding piece is at a distance from the outer surface of the nozzle tip to thereby define a chamber.

33. An injection molding apparatus comprising:
- a manifold, including at least one runner that receives melt from a melt source;
- a nozzle in fluid communication with at least the runner of the manifold, the nozzle including,
  - a nozzle body including a melt passage therethrough,
  - a nozzle tip formed of a first material, including an outer surface and a tip melt passage therethrough, wherein the tip melt passage is in fluid communication with the melt passage of the nozzle body, and
  - a tip surrounding piece formed of a second material, the tip surrounding piece being removably coupled to the nozzle body and retaining the nozzle tip in position with respect to the nozzle body, the tip surrounding piece including an inner surface, wherein at least a portion of the inner surface of the tip surrounding piece is at a distance from the outer surface of the nozzle tip to thereby define a chamber, and wherein the thermal conductivity of said first material is equivalent to the thermal conductivity of said second material;
- a heat source thermally coupled to said nozzle; and,
- a mold component having a mold cavity for receiving melt from said nozzle through a mold gate.

34. The injection molding apparatus defined in claim 33, wherein said first material is selected from the group consisting of: Beryllium-Copper, Tungsten Carbide, tool steel, and H13.

35. The injection molding apparatus defined in claim 34, wherein the first material and the second material are the same.

36. The injection molding apparatus defined in claim 33, wherein an outer surface of the tip surrounding piece is in contact with a surface of the mold component to thereby define a seal.

* * * * *